US012432267B2

(12) United States Patent
Kamaraju et al.

(10) Patent No.: US 12,432,267 B2
(45) Date of Patent: Sep. 30, 2025

(54) 3D MESH GENERATION ON A SERVER

(71) Applicant: STREEM, LLC, Portland, OR (US)

(72) Inventors: Pavan K. Kamaraju, London (GB); Renganathan Veerasubramanian, Pleasanton, CA (US)

(73) Assignee: STREEM, LLC, Portland, OR (US)

( * ) Notice: Subject to any disclaimer, the term of this patent is extended or adjusted under 35 U.S.C. 154(b) by 185 days.

(21) Appl. No.: 17/333,896

(22) Filed: May 28, 2021

(65) Prior Publication Data

US 2022/0385721 A1 Dec. 1, 2022

(51) Int. Cl.
*G06T 17/20* (2006.01)
*H04L 67/02* (2022.01)
*H04L 67/06* (2022.01)

(52) U.S. Cl.
CPC .............. *H04L 67/06* (2013.01); *G06T 17/20* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 9,298,741 | B1* | 3/2016 | Strand | H04N 21/4627 |
| 10,387,582 | B2 | 8/2019 | Lewis et al. | |
| 11,127,223 | B1* | 9/2021 | Bhushan | G06T 17/20 |
| 11,551,421 | B1* | 1/2023 | Bhushan | G06T 19/20 |
| 11,893,675 | B1* | 2/2024 | Bhushan | G06T 17/00 |
| 2005/0063582 | A1* | 3/2005 | Park | G06T 17/10 |
| | | | | 382/181 |
| 2016/0210753 | A1* | 7/2016 | Klusza | H04N 13/106 |
| 2016/0307357 | A1* | 10/2016 | Vats | G06T 15/04 |
| 2017/0032568 | A1* | 2/2017 | Gharpure | G06T 13/20 |
| 2017/0053447 | A1* | 2/2017 | Chen | G06T 19/006 |
| 2017/0243403 | A1* | 8/2017 | Daniels | G06F 3/1454 |
| 2017/0289623 | A1* | 10/2017 | Bailey | H04N 21/4542 |
| 2017/0309024 | A1* | 10/2017 | Kitamura | G06T 7/11 |
| 2018/0186082 | A1* | 7/2018 | Randhawa | B22F 12/44 |
| 2018/0276882 | A1* | 9/2018 | Harviainen | G06T 19/006 |

(Continued)

OTHER PUBLICATIONS

Korean Intellectual Property Office; International App. No. PCT/US2022/026713; Filing Date: Apr. 28, 2022; International Search Report and Written Opinion; Dated: Aug. 9, 2022; pp. 1-10.

(Continued)

*Primary Examiner* — Sultana M Zalalee
(74) *Attorney, Agent, or Firm* — Schwabe Williamson & Wyatt

(57) ABSTRACT

Embodiments include systems and methods for generating a 3D mesh on a server from one or more images and other data of a physical space that is captured by a device. The device may capture images with RGB data that includes depth information for pixels of the one or more images. The server may then create or update a 3D mesh based upon the images and depth information. The server may also use received images to provide textures to the various surfaces of the 3D mesh. The server may then cause a 3D model of the physical space to be viewed by another device, either by transmitting the 3D mesh for the other device used to construct a 3D model, or by rendering the 3D model directly on the other device. Other embodiments may be described and/or claimed.

7 Claims, 10 Drawing Sheets

(56) References Cited

U.S. PATENT DOCUMENTS

| | | | | |
|---|---|---|---|---|
| 2018/0357825 A1* | 12/2018 | Hofmann | ............... | A61B 34/20 |
| 2019/0042832 A1 | 2/2019 | Venshtain | | |
| 2019/0108683 A1* | 4/2019 | Valli | ................... | G06T 19/003 |
| 2019/0310819 A1 | 10/2019 | Xu et al. | | |
| 2020/0051338 A1* | 2/2020 | Zia | ......................... | G06F 9/451 |
| 2020/0053347 A1* | 2/2020 | Marchak, Jr. | ......... | H04N 19/00 |
| 2020/0186887 A1* | 6/2020 | Kwon | .................... | G11B 27/34 |
| 2020/0357172 A1 | 11/2020 | Lee et al. | | |
| 2020/0372709 A1 | 11/2020 | Ponjou Tasse et al. | | |
| 2020/0402261 A1* | 12/2020 | Hemmer | .................. | G06T 9/00 |
| 2021/0049203 A1* | 2/2021 | Gupta | .................. | G06F 40/205 |
| 2021/0056747 A1* | 2/2021 | Hefny | ..................... | G06T 17/20 |
| 2021/0295599 A1* | 9/2021 | Adkinson | .............. | G06T 7/579 |
| 2023/0134130 A1* | 5/2023 | Robert | .................. | G06T 15/506 |
| | | | | 345/426 |
| 2023/0409749 A1* | 12/2023 | Li | ...................... | H04N 21/4318 |

OTHER PUBLICATIONS

Korean Intellectual Property Office; International App. No. PCT/US2022/026713; Filing Date: Apr. 28, 2022; International Preliminary Report on Patentability; Dated: Dec. 7, 2023; pp. 1-7.

\* cited by examiner

NON-TRANSITORY COMPUTER-READABLE STORAGE MEDIUM
1002

PROGRAMMING INSTRUCTIONS 1006
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 10

3D MESH GENERATION ON A SERVER

TECHNICAL FIELD

The present disclosure relates to the field of augmented reality (AR), and specifically to capture of raw image and associated AR data, and subsequent processing.

BACKGROUND

Devices such as smartphones and tablets are increasingly capable of supporting augmented reality (AR). These devices may capture images and/or video and, depending upon the particulars of a given AR implementation, the captured images or video may be processed using various algorithms to detect features in the video, such as planes, surfaces, faces, and other recognizable shapes. These detected features, combined in some implementations with data from depth sensors and/or motion information captured from motion sensors such as a MEMS gyroscope and accelerometers, can facilitate AR software in creating a point cloud in a three-dimensional space. This point cloud enables AR-based applications to generate and place virtual objects within a 3D space represented by the captured images and/or video. These point clouds may be associated and stored with their source images, video, and/or depth or motion data.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 10 is a block diagram of a computer-readable storage medium that can be used to implement some of the components of the system or methods disclosed herein, according to various embodiments.

DETAILED DESCRIPTION OF DISCLOSED EMBODIMENTS

Figure 1:
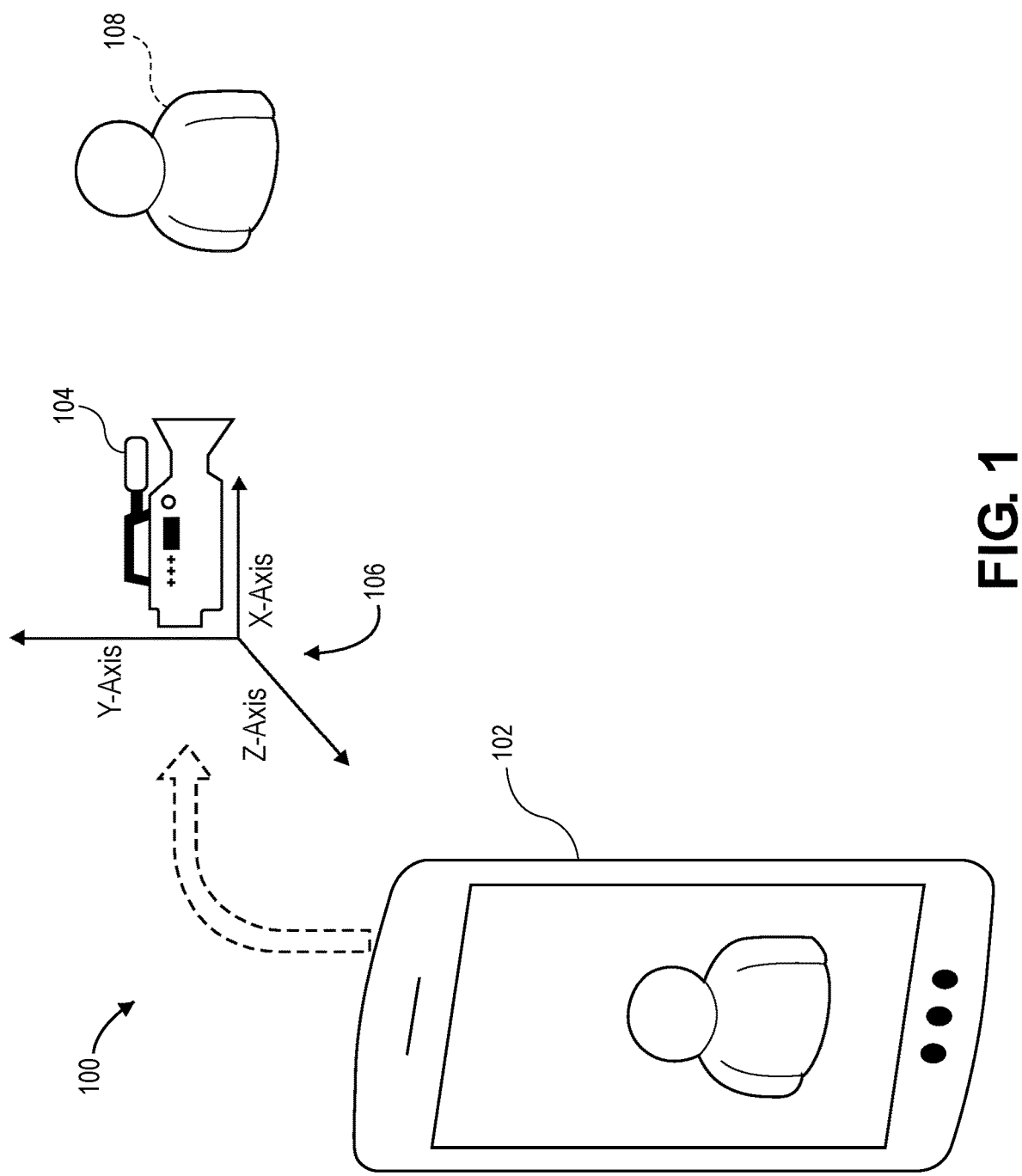
FIG. 1 illustrates a block diagram of the components of a system for capturing an image and corresponding AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

A device that supports AR typically provides an AR session on a device-local basis (e.g., not requiring communication with a remote system), such as allowing a user of the device to capture a video using a camera built into the device, and superimpose AR objects upon the video as it is captured. Support for superimposing AR objects is typically provided by the device's operating system, with the operating system providing an AR application programming interface (API). Examples of such APIs include Apple's ARKit, provided by iOS, and Google's ARCore, provided by Android.

The APIs typically use both the stream of frames captured by the device camera as well as other available motion data, such as a gyroscope and/or accelerometers contained within the device, to compute a point cloud. The point cloud typically includes one or more points that are indicated by an x, y position within the video frame along with a depth (or z-axis). The points are often tied to an identified anchor feature within the frame, e.g. a corner or edge of an object in-frame, which can be readily identified and tracked for movement between frames. The associated x, y, and z values allow the point to be identified in space relative to the device. As may be appreciated, these x, y, and z values will continuously change for each detected/calculated point as the camera of the capturing device moves in space relative to the anchor features. In some implementations, each point in the point cloud may include additional data, such as a confidence value indicating the API's estimate of the accuracy of the computed depth value, location of the anchor point, and/or possibly other extrapolated values.

The calculated point cloud allows AR objects to be placed within a scene and appear to be part of the scene, viz. the AR object moves through the camera's view similar to other physical objects within the scene as the camera moves. Further, by employing object detection techniques along with motion data, in some implementations the API can maintain track of points that move out of the camera's field of view. This allows a placed AR object to disappear off-screen as the camera moves past its placed location, and reappear when the camera moves back to the scene location where the AR object was originally placed.

As may be understood from the foregoing description, the point cloud represents location data about the physical world relative to and surrounding the capturing device. The various points in the point cloud are thus (in most implementations) expressed as values relative from the capturing device. When the capturing device moves, e.g. is panned or tilted, in a sense, these values change, e.g. can be recomputed using sensed motion data about the movements of the capturing device, as though the world were moving about the capturing device's position, with the capturing device serving as a fixed reference point. The motion data captured by the capturing device, then, effectively expresses how the world moves about the capturing device. As the capturing device moves, an increasing amount of the world becomes visible to the capturing device. When combined with continued tracking/storage of detected points that move outside the camera's field of view, the point cloud representing the world detected and viewed through the capturing device's camera that is initially generated can be progressively increased and expanded.

By combining this stored and expanded point cloud with captured images and/or video and any AR information, useful structures, such as a 3D mesh and/or 3D scene graph, representing the world detected by the capturing device can be generated. By combining point cloud data with images from the video, the 3D mesh can be subsequently rendered as a model of the detected world. Further, by correlation of each frame in the video with its captured AR data, the image information from each frame can be mapped upon the 3D mesh, to effectively create a relatively photo-accurate 3D model of the world captured by the capturing device. This 3D model, in embodiments, can be manipulated in a 3D environment and viewed from perspectives different from the original capturing device. In some embodiments, the 3D model can be progressively generated and expanded on the fly as the capturing device continues to move about its environment, viewing previously uncaptured portions of the environment. When the capturing device moves back to previously viewed portions of the environment, the 3D model can be augmented and/or refined, particularly where the capturing device is viewing the previously viewed portions at a different perspective, even if only slightly different from the initial perspective.

In embodiments, the 3D mesh may be created on a server device, or within a cloud infrastructure, based upon information captured by a consumer device. The consumer device may capture images and/or video and AR information as discussed above. In addition, the AR information may include depth maps associated with one or more images, and camera pose information, including camera positions associated with the one or more images. The depth maps and the camera pose information may be streamed to the server, where the server will then construct a 3D mesh that may be provided to other devices, for example a personal computer or a tablet that is being used by a service professional to evaluate the physical environment proximate to the consumer device. One or more images may be used to provide a texture for the 3D mesh to provide a more realistic 3D model of the physical environment. These one or more images may also be included in the AR information.

A service professional may download the 3D mesh from the server for viewing, and may subsequently add, remove, or modify elements to the 3D mesh, for example adding a new virtual appliance to a location within a kitchen, and re-upload the resulting 3D mesh including images to the server. The server may then update the 3D mesh including the new virtual appliance, and download the 3D mesh including texturing to the consumer device for viewing. In this example, both the service professional and the consumer may either download the 3D mesh to have the 3D model rendered on their local devices, or may remotely access the server to display the rendered 3D model on the device, for example within a browser window.

FIG. 1 illustrates an example system 100 that may enable capture of an image or video that includes AR data. System 100 may include a consumer device 102. In the depicted embodiment of FIG. 1, consumer device 102 is a smartphone, which may be implemented as a computer device 500, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. Consumer device 102 further may include a camera 104 and a spatial position sensor 106 (depicted by a series of axes), which provides information about the spatial position of camera 104. It will be understood that camera 104 and spatial position sensor 106 may be contained within the body of device 102. Camera 104 is used to capture the surrounding environment of device 102, and by extension, the user. The environment may include one or more three-dimensional objects 108.

Camera 104 may be any camera that can provide a suitable video stream for the intended purpose of consumer device 102. Where consumer device 102 is implemented as a smartphone or tablet, camera 104 may be one or more built-in cameras. In other embodiments, such as where consumer device is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and consumer device 102. In other embodiments, such as where consumer device 102 is equipped with multiple cameras or similar sensors, one or more of the sensors may be configured to directly detect depth points, such as a 3D camera, LIDAR, or other suitable depth-sensing technology.

Spatial position sensor 106 may be configured to provide camera pose information, such as positional information about camera 104, such as camera 104's pan and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

Figure 2:
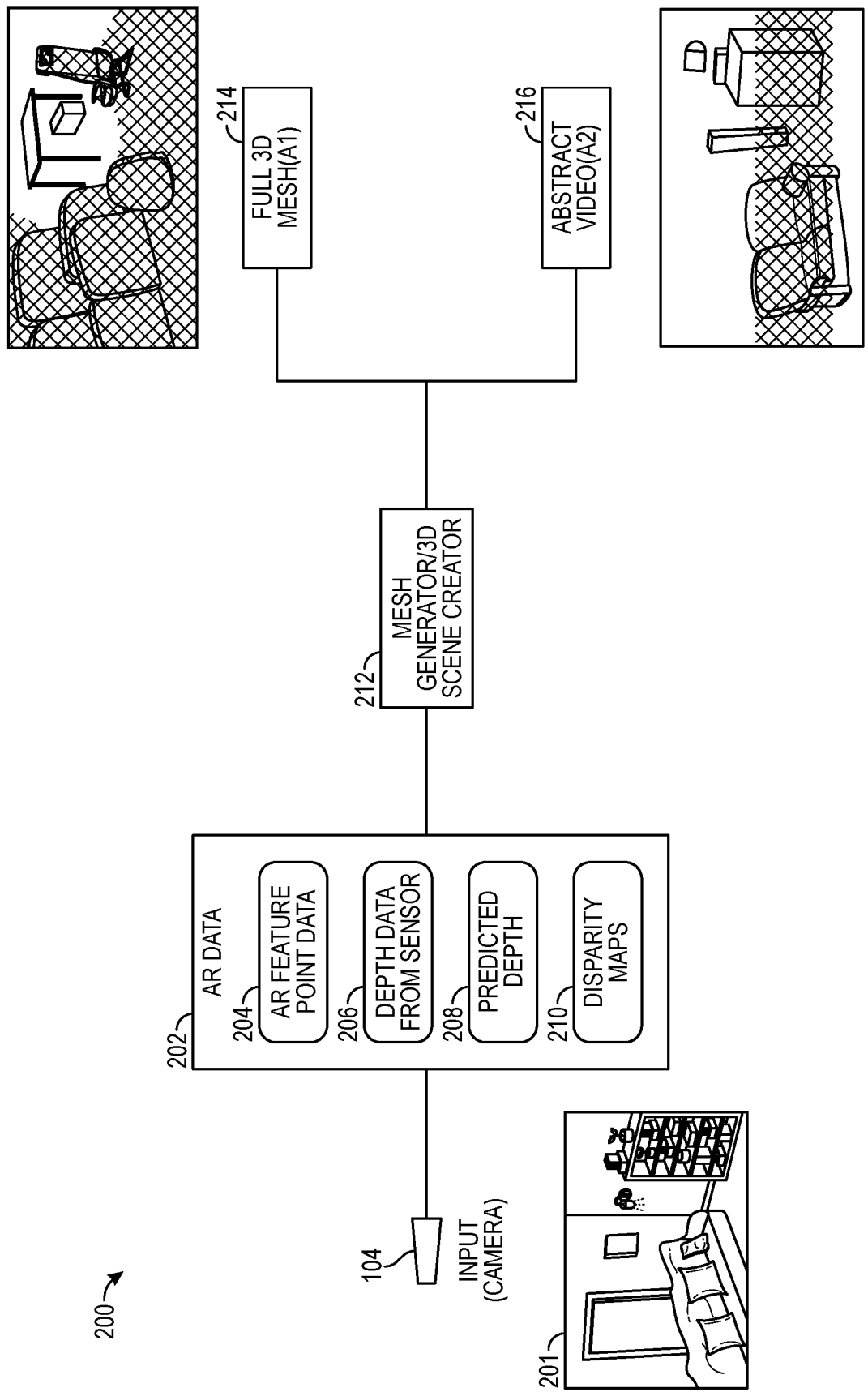
FIG. 2 depicts an example high-level process flow for generating a full 3D mesh from a captured video and associated AR data, according to various embodiments.

FIG. 2 depicts an example process flow 200, according to embodiments, for the capture of a video and associated AR data, and subsequent processing of the video and data into a 3D mesh and abstract video. Initially, a video 201 is captured by an input device, such as a camera 104, along with associated camera pose information, such as motion data (not depicted). This video 201 is then, in embodiments, processed by the AR API of the capturing device (e.g. ARKit, ARCore) to generate AR data 202, which may be tagged to the video 201. Note that, as used herein, AR data 202 is not data about AR objects, rather, AR data 202 is the data that corresponds to video 201 that may be necessary to enable the placement of AR objects within the captured scene. This AR data 202 may then be used to generate a mesh and/or 3D scene by a mesh generator/scene creator 212. Finally, the mesh and/or 3D scene can be used to generate a full 3D mesh 214, which includes frames from the video 201 (and/or other sources of relevant images) mapped upon the 3D mesh 214 to generate a relatively realistic model. Alternatively or additionally, an abstract video 216, which may present an untextured or partially textured representation of the scene captured by the camera 104, may be generated from the detected points in the point cloud. The model can then be used in an interactive fashion. In some embodiments, abstract video 216 may be subseuqently fully textured to result in a full 3D mesh, similar to full 3D mesh 214.

In the depicted embodiment of FIG. 2, AR data 202 may be captured contemporaneously with and/or extracted or computed from, video 201, and may be tagged to video 201, potentially on a frame-by-frame basis (discussed in greater detail below). AR data 202 may include AR feature point data 204, depth data from the sensor 206, predicted depth data 208, and/or disparity maps 210. Other embodiments may include additional data types, different data types, or fewer data types. The various types of AR data 202 may be derived from various raw data inputs, including RGB images (such as the sequence of frames of video 201), camera pose information including camera intrinsics and/or camera transforms (such as from camera 104 and/or spatial position sensor 106), 3D feature points, and/or depth images, among other types of possible data. RGB images may be extracted from frames of the video captured by camera 104. In addition to motion data from spatial position sensor 106, camera intrinsics can include various known or readily determined properties of camera 104, such as focal length, aperture, optical center, angle of view, focal point, etc. For example, knowing the focal point of a camera can allow a rough approximation of distance (depth) to a feature when that feature is in focus. Whether a feature is in focus may be determined by techniques such as edge detection or another contrast-based technique. However, it will be appreciated that, in some instances, only a range of depths may be determined, such as where camera 104 is focused relatively far away from the camera position, and/or the camera 104 utilizes a small aperture (relatively high f-stop, such as f/8, f/11, etc.), so as to offer a large depth of field.

Camera pose information, including camera transforms, can include the various variables necessary to transform between the 3D objects within the field of view of camera 104 and the 2D image plane of the camera 104. Such variables can include information about the spatial location of the capturing device. 3D feature points can include feature points useable by the AR API to create the AR feature point data 204, and may be extracted from video 201, such as various anchor points or features, and/or captured using one or more sensors that are separate from video 201, such as spatial position sensor 106. Depth images can include imaging captured by a depth-sensitive device, such as a LI DAR sensor or infrared range finder, to allow for direct, and potentially more precise, depth measurements of various points within the scene captured by camera 104. Where direct depth measurements are available, data similar to that available for camera 104 may be used (e.g., camera intrinsics and camera transforms) to process the depth measurements and correlate with the images from camera 104.

As mentioned above, AR feature point data 204 can include data concerning or otherwise identifying various feature points in the captured scene that are identified by the AR API. These feature points may include anchor points corresponding to various identified features such as edges, points, planes, and other features detected via an object recognition algorithm or other suitable technique, and/or otherwise detected directly or indirectly by a sensor such as spatial position sensor 106. Depth data from sensor 206 may include the aforementioned direct depth measurements, which may be correlated with identified AR feature point data 204 by the AR API. Corollary to or alternative to depth data from sensor 206 includes predicted depth data 208, which the AR API may derive from any number of techniques, such as machine learning, or photogrammetry and comparison between proximate frames of the captured video. Similar to such comparison are disparity maps 210, which may include a map indicating the field of view differences between left/right frames in the case of a stereo camera, or proximate frames of the captured video. A disparity map 210 may be useful for computing points in the point cloud, including obtaining predicted depth data 208. It should be understood that proximate frames need not be temporally adjacent in video 201, but rather proximate in terms of field of view: two frames need only simply share at least an overlapping portion of a given scene to be considered proximate for purposes of a disparity map 210.

The mesh generator/scene creator 212, in embodiments, receives the AR data 202 and uses it to generate a 3D mesh, which may then be output as a full 3D mesh 214 and/or an abstract video 216. It accomplishes this by executing one or more of the steps of method 300, described below with respect to FIG. 3.

The resulting output from the mesh generator/scene creator 212 can be a full 3D mesh 214, where the RGB image from various frames of video 201 are mapped onto a 3D mesh generated using the AR data. Such a process may be considered a type of texture mapping, where the RGB image of various frames are used as texture maps. Such mapping requires that the AR data 202 be correlated to each frame from the video 201. The process by which the AR data 202 is correlated will be described in greater detail below. Mapping the RGB image from various frames of video 201 effectively stitches the frames together as they are mapped onto the 3D mesh. The full 3D mesh 214 provides a geometric representation of the captured scene. The full 3D mesh 214 can be used for various purposes, such as simulating physical interactions with objects in the environment represented by the full 3D mesh 214, inserting/editing/removing one or more AR objects, taking measurements of the represented environment, later exploration or walk-through, or another suitable purpose. In some embodiments, the full 3D mesh 214 can be later modified and/or further refined if additional AR data becomes available and is correlated to the full 3D mesh 214. Also or alternatively, an abstract video 216 can be output. As mentioned above, abstract video 216 may, in embodiments, be used to subsequently prepare a full 3D mesh.

It should be understood that, while the foregoing description and subsequent discussions assume that video 201 is in color, e.g. comprised of a plurality of frames that each include an RGB image, other image formats may be utilized. For example, the image data of each frame may instead be expressed using different color systems such as YUV, HSL, CMYK, or another method of expressing color, in alternative embodiments. In still other embodiments, the image information may comprise black and white or greyscale information, with no color information. Further still, other embodiments may utilize a combination of color and grey-scale/black and white images.

The abstract video 216 may essentially reproduce the original video captured from camera 104, but with frames generated by rendering objects from the 3D mesh. In some embodiments, the original RGB images from each frame may not be texture mapped to the rendered objects, providing additional abstraction. By not mapping the RGB images, the resulting abstracted video 216 depicts the 3D objects captured by the point cloud in an abstract fashion, as a collection of generic objects. Each frame of the original video may be reproduced based on the correlated AR data 202 associated with the original frame. The resulting abstract video 216 may be useful for providing a recreation of a captured scene, but without minimal to no unique objects that could be used to identify the particular location of the scene. Alternatively/additionally, the abstract video 216 may allow for maintaining the privacy of the captured location and/or the person or persons capturing the initial video. Still further, the generic objects could be removed or manipulated, and/or other generic objects inserted, to further anonymize the abstract video 216.

Figure 3:
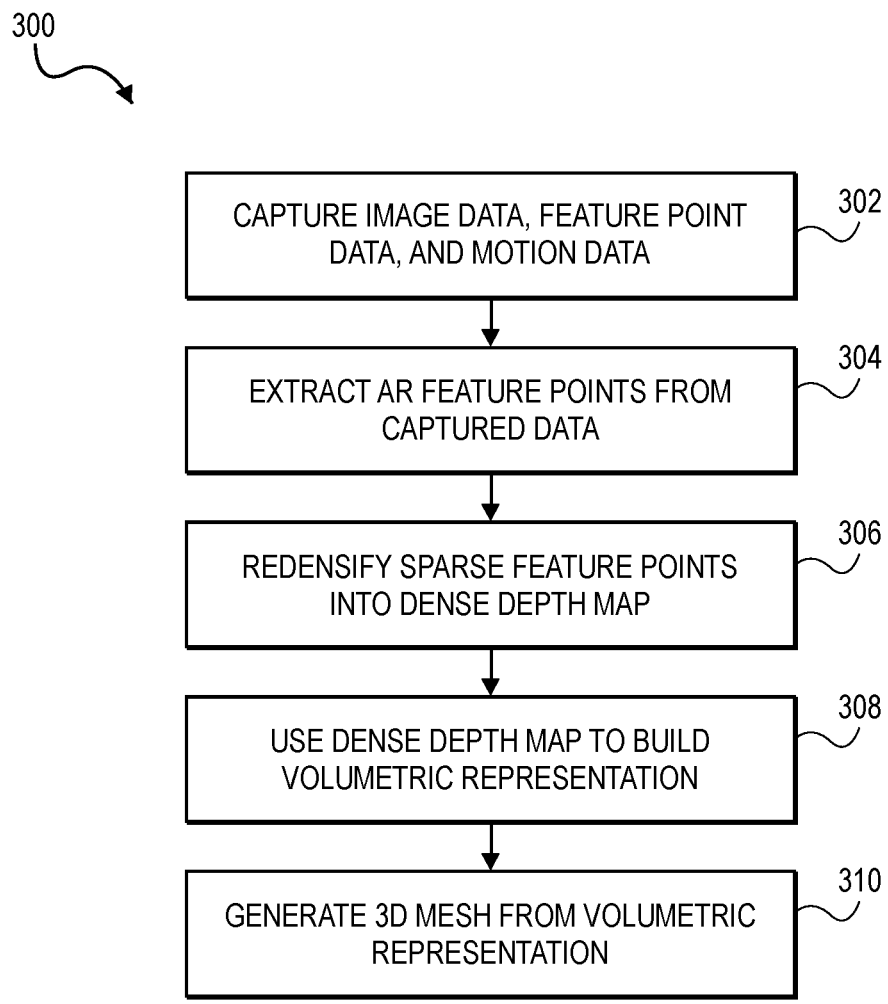
FIG. 3 is a flowchart of the operations of an example method for generating a 3D mesh useable with the example high-level flow of FIG. 2, according to various embodiments.

FIG. 3 depicts an example method 300 for using AR data, such as AR data 202, to generate a 3D mesh. Various embodiments may implement only some or all of the operations of method 300, and each of the operations of method 300 may be performed in whole or in part. Some embodiments may add additional operations. In operation 302, a video may be captured along with associated AR data, as described above with respect to FIGS. 1 and 2. The AR data may be associated with each frame of the video or with a group of frames, and may include data as described above, such as camera pose information, including camera intrinsics, camera transforms, 3D feature points, depth images, and/or any other relevant information that may be captured or otherwise made available. The captured video may come from a variety of sources. In some examples, a camera 104 is used to capture the video. In other examples, a different device or devices may be used to capture the video. The AR data may come from, in some examples, other sensors as described above with respect to FIGS. 1 and 2, such as spatial position sensor 106. In embodiments, the video and AR data are captured contemporaneously to ensure appropriate association between the AR data and corresponding video frames. The video and associated AR data may be captured at a previous time, and stored into an appropriate file format that captures the video along with the raw feature points and motion data. In some embodiments, video may be subsequently captured and merged with previously captured AR data, or vice-versa. Method 300 may then be performed on the stored video and associated data in post-processing.

In operation 304, AR feature points may be extracted from the captured video, also as described with respect to FIGS. 1 and 2. In embodiments, operation 304 may be performed in whole or in part by an AR API, as discussed above on a capturing device. The AR feature points may be obtained, such as by the AR API, using simultaneous localization and mapping (SLAM), or another suitable technique. In examples where the video is provided as a file from a past capture, the AR feature points may be stored with the video, and correlated to each video frame, similar to the AR data discussed above with respect to operation 302. In some embodiments, the AR feature points may be calculated from a raw video without associated AR data using photogrammetric techniques.

The AR feature points may be relatively sparse with respect to the captured video, such as where the AR feature points are calculated by an AR API contemporaneously with the video capture, and/or the feature points cannot be directly measured, but must be extrapolated from the video capture. In operation 306, the video and associated AR data are used to redensify the captured AR feature points into a dense depth map. This may be accomplished using various suitable techniques that incorporate AR data, AR data 202 an example of such AR data. Inputs to densify the AR feature points may include the various color images obtained from the individual frames of the captured video; camera pose information, which may include data about the camera position and movements, discussed above, and 3D feature points (such as the AR feature points).

One possible algorithm useful for creating a dense depth map includes, for a given frame of the captured video, first generating a 3D base mesh M that covers the RGB image of the frame, such as by computing a Delaunay Triangulation from the high-gradient pixels in the frame. The 3D base mesh M may include a plurality of vertices. The high-gradient pixels typically indicate a textured area, and the 3D mesh can be propagated to low-gradient (e.g., untextured) areas, discussed below. Next, the AR feature points obtained in operation 304, and/or obtained via simultaneous localization and mapping (SLAM), may be segmented into clusters based upon relative distances from each other, such that AR feature points are clustered with other points that are relatively proximate. Then, a depth value can be assigned to each vertex in the 3D base mesh M, to minimize an energy function E. The energy function takes two main terms: a data term that constrains points interior to the 3D base mesh M to the same depth as the AR feature points, and a smooth term that constrains neighboring areas of the 3D base mesh M to similar values when the pixels corresponding to the neighboring areas of the 3D base mesh M are similar in value. Finally, as mentioned above, the depth values of the base mesh vertices are propagated to the remainder of the image (e.g. the values are assigned to the low-gradient areas), which results in a dense depth map.

Other possible algorithms or techniques may be used for creating the dense depth map. For example, where a capturing device has or is associated with a sensor that can directly measure depth points in a scene, the direct measuring sensor may be capable of providing sufficient directly measured depth points to produce a dense depth map. Another possible method is to use a disparity map, such as disparity maps 210 of AR data 202, to estimate depth data and propagate the data to areas of a similar or low gradient within the disparity map. Such an approach may be considered a form of photogrammetry, relying upon perspective differences between two given frames of approximately the same scene. Still another method may employ a trained neural network (e.g. trained using images and associated dense depth maps) to process a given frame and generate the densified depth map. This operation may be repeated iteratively for each frame in the captured video, to result in a dense depth map that covers the entire space captured in the video. Another possible method is to use the camera pose and video to directly predict a TSDF volume of the space, instead of depth maps. The foregoing are intended to be examples only, and not a comprehensive list of possible approaches to creating the dense depth map. Other approaches that are now known or later developed may be applied for dense depth map creation, depending upon the specifics of a given implementation.

In operation 308, the dense depth map is used to build a volumetric representation of the space captured in the video. Operation 308 includes integrating the image from each frame with the dense depth map to build the volumetric representation. The resulting volumetric representation may be expressed with a volumetric truncated signed distance function (TSDF) volume. The TSDF volume is comprised of a plurality of cells, where each cell is given a value that indicates the signed distance to the closest real-world surface. Other techniques known in the art may be used to build the volumetric representation, and/or express the volumetric representation. Further, as with operation 306, operation 308 may be repeated iteratively for each frame to build a complete representation from the entire captured video. For example, the resulting cells of the TSDF volume can be iteratively updated by fusing each image and associated portion of the dense depth map for each successive frame, resulting in a 3D volume that represents the entire environment captured in the video.

In operation 310, the volumetric representation is used to generate a full 3D mesh. The full 3D mesh, in embodiments, is a collection of vertices and triangles that connect the vertices. Each vertex may have various types of data attached or otherwise associated with it. For example, in various embodiments the data may include the 3D position of the vertex (expressed with respect to a common origin point), a normal (a vector perpendicular to an underlying surface at the vertex), and color data (e.g. RGB color where the RGB system is used, or other color data, or greyscale or black and white data where color is not employed). Other embodiments may include more or less data at each vertex. The data may be stored and associated with each vertex in any appropriate fashion, such as a data structure that is part of each vertex, in a separate store along with a unique identifier that corresponds to a particular vertex, or another fashion suitable for a given implementation.

In one possible embodiment, a marching cubes algorithm can be used to extract triangular surfaces from the volumetric representation from operation 308. The algorithm divides the volumetric representation into a plurality of cubes, then identify cubes that intersect with an underlying surface, which may define one or more triangles. The surface may be identified from the TSDF function described above. Once the triangles are identified, associated vertices can be generated, resulting in the full 3D mesh. The marching cubes algorithm can be performed incrementally, e.g. on a frame by frame or other periodic basis as the video is progressively processed, to progressively develop the full 3D mesh, or may be performed once all frames in the captured video have been processed and fused to the 3D volume in operation 308, to result in the final 3D mesh. A progressive approach may be utilized where the mesh is constructed "on the fly", such as when a video stream is ongoing. Such an approach can potentially provide an interactive 3D mesh that is immediately useable, and expands as the video stream may pan to previously unviewed portions of the environment. Other algorithms known in the art may be employed, depending upon the specifics of a given implementation.

Depending upon the capabilities of an implementing system or device, method 300 may be performed progressively while the video is being captured, or may be performed on a complete captured video and associated AR data.

In addition to building a 3D mesh, the captured video and associated AR data (including data calculated in the various operations of method 300) may be useful for performing object detection, which may be employed to extract various 3D objects from a captured video. In some embodiments, object detection is performed as part of generating the abstract video 216. Following object detection, a 3D scene graph may be constructed, which can be used for triggering content, such as AR content, at specific locations within the 3D mesh based upon the determined locations of the various 3D objects.

Figure 4:
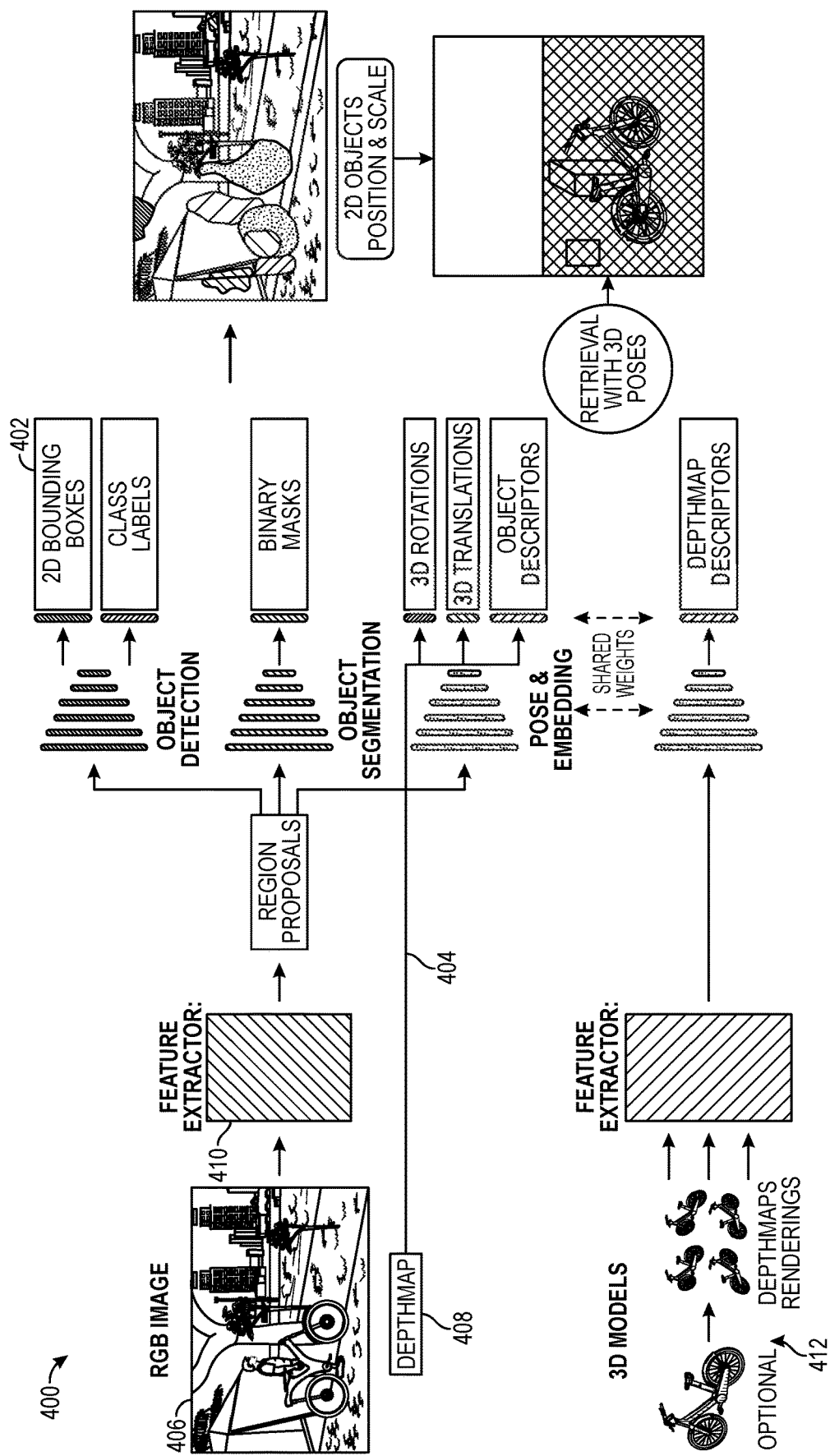
FIG. 4 is an example process flow for object detection and mapping to 3D object models of a captured video and associated 3D mesh from FIG. 2, according to various embodiments.

FIG. 4 outlines an example flow 400 for detection and extraction of various 3D objects from the 3D mesh, dense depth map, and/or images from the various frames of the captured video, and construction of a 3D scene graph, according to various embodiments.

An image 406, such as may be obtained from a frame of the captured video, is passed through a feature extractor 410. In embodiments, each frame may be individually analyzed for features. In some embodiments, analysis across multiple frames may additionally/alternatively be performed to detect features from the captured video. Such analysis may be performed using known techniques for feature detection within a video stream. Object detection is then performed on the extracted features, to obtain object properties 402 such as 2D bounding boxes, class labels, binary masks such as segmentation masks, shape descriptors, and other data relating to detected objects. In some embodiments, feature extractor 410 may use or incorporate a deep learning neural network to perform this object detection, and this generates the bounding boxes, image segmentation, segmentation masks, etc. An existing technique such as Mask-RCNN may be used for the neural network object detection in embodiments, or another suitable technique currently known or later developed.

Following extraction of the objects as conveyed by object properties 402, in the depicted example, the detected objects may be intersected 404 with the dense depth map 408, to provide a 3D position, 3D rotation, and/or 3D shape for each detected object. In embodiments, the dense depth map 408 may have been generated as a result of operation 306 of method 300, discussed above. The 3D shape may be determined by referencing, or comparison of the object properties 402, such as shape descriptors, mentioned above, with a database 412 of known shapes and 3D models. This results in a graph of 3D objects that are detected within the captured video, which in turn can be used with the full 3D mesh, such as the 3D mesh resulting from operation 310 of method 300, to enable additional interactions with the 3D mesh beyond the interactions available with a 3D mesh that simply presents an undifferentiated solid model or volume.

In other words, the graph of 3D objects are detected objects that are present within the environment captured in the video stream 201 by camera 104. The objects may be rendered in abstract, in the case of abstract video 216, or texture mapped, as in full 3D mesh 214. In some embodiments, these objects may be manipulated, e.g. moved, rotated, or even potentially deleted, similar to inserted AR objects. In embodiments, if a recognized object is moved, smooth surfaces for the surrounding environment may be extrapolated, and surface textures updated with a subsequent image capture of the environment that includes the surface. In embodiments, as the camera moves, the surfaces can be updated in real time. If objects are manipulated, the corresponding manipulation may be updated as the surface is updated. For example, the layout of the floor can be visualized in different textures and if objects are added or moved then the corresponding textures can be updated.

Figure 5:
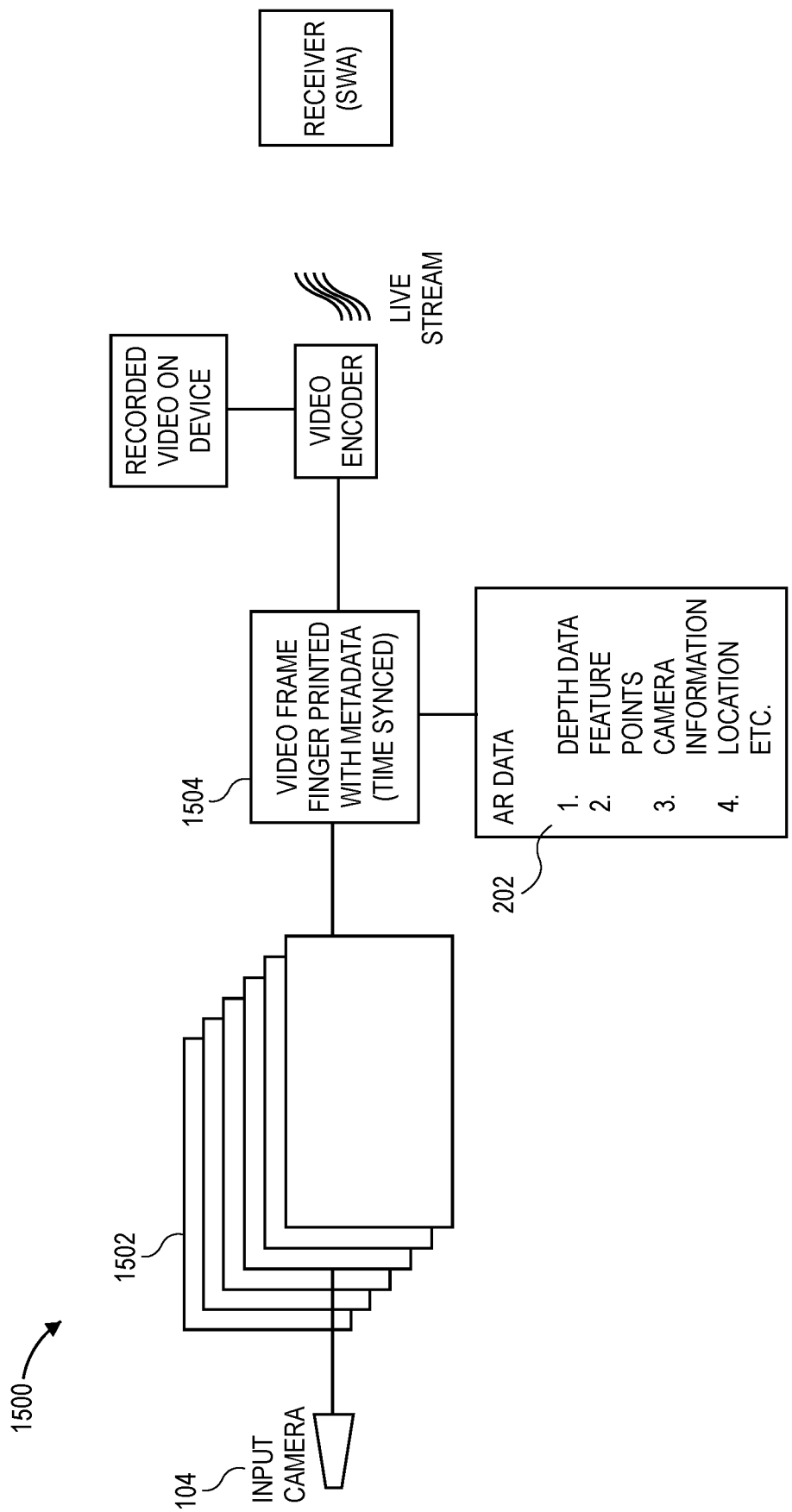
FIG. 5 depicts an example high-level flow for fingerprinting a captured video for synchronization with contemporaneously captured AR data, according to various embodiments.

As mentioned above, various steps of method 300 rely upon the AR data to be time synchronized with the associated frames in the captured video. In FIG. 5, an example flow 1500 for synchronizing frames 1502 of a video captured by a capture device and creation of an AR video is depicted. Frames 1502, in various embodiments, are the individual sequential frames of a video, such as video 201 that may be captured by a video camera 104. Following a fingerprinting process that will be described below, a fingerprinted frame 1504 results that is synced with a portion of AR data, such as AR data 202, that was captured substantially contemporaneously with the frame 1502. The end result is that each frame 1502 from the captured video becomes a fingerprinted frame 1504, thus providing a fingerprinted video that is synced with the AR data on a frame by frame basis. The collection of fingerprinted frames may be played back similar to the original captured video, but in synchronization with the AR data. AR data is described above with respect to FIG. 2. Playing back the fingerprinted video with AR data results in AR feature points being available that are synchronized with each video frame, similar to how originally generated by an AR API executed on the capturing device.

Figure 6:
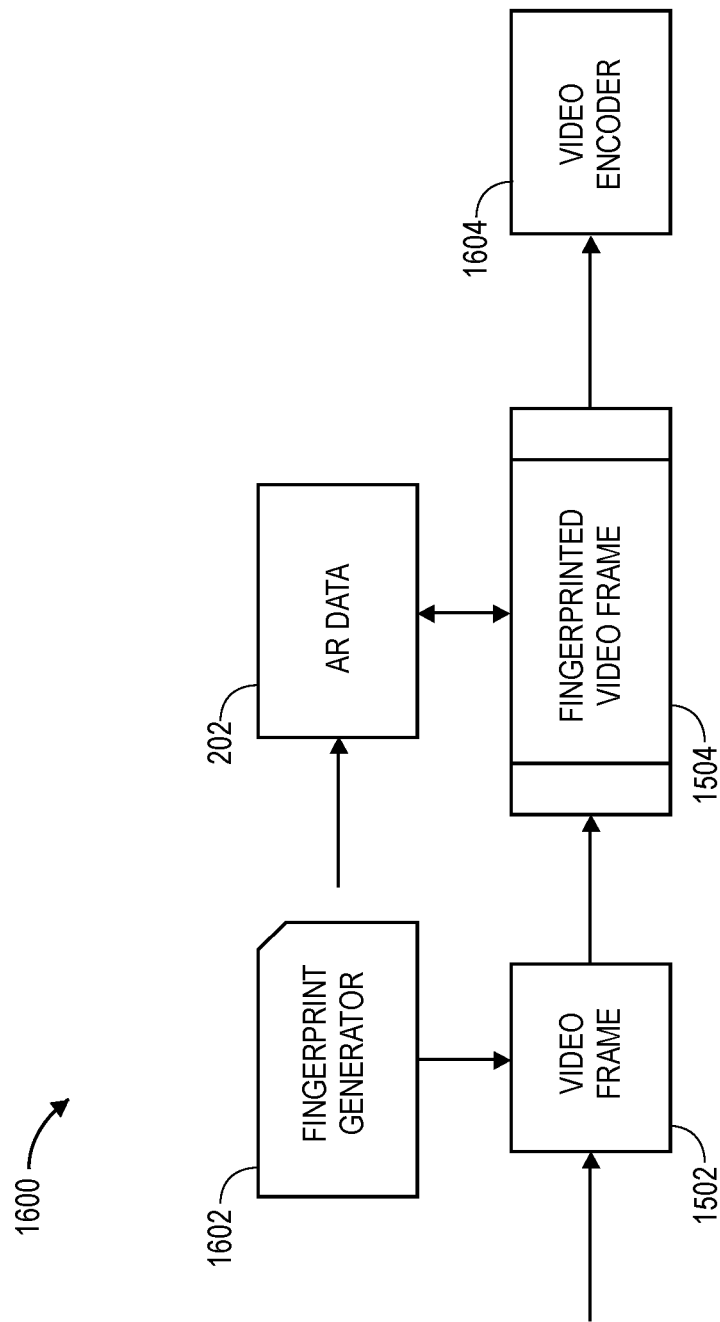
FIG. 6 depicts an example flow for fingerprinting the video frames that may be carried out in the high-level flow of FIG. 5, according to various embodiments.

Turning to FIG. 6, the fingerprinting process 1600 that results in each fingerprinted frame 1504 is depicted. A frame 1502 from the captured video, in embodiments, includes a timestamp or timecode, which can be used to synchronize the frame with data external to the frame, such as an audio track, or other data track. The timestamp of each frame may result in a running timecode when the video is played. The AR data, such as AR data 202, can comprise one or more data tracks that can be synced to the video. Process 1600 includes a fingerprint generator 1602, which creates a fingerprint data field that is unique for each frame and, by extension, for AR data associated with each frame. This fingerprint data field is then tagged to each frame 1502, resulting in fingerprinted video frame 1504, as well as the portion of AR data that corresponds to the frame 1502. The fingerprint in video frame 1504 may be visible or invisible to a viewer of the video frame, depending upon the method employed to tag the video frame. For example, the video frame fingerprint may be embedded within the image data of each frame in a location that is visible (e.g., traditional timecode), is out of frame (e.g. in image data that extends outside the visible area), is in metadata associated with each frame (such as a data structure for each frame that includes frame information separate from image data), or is embedded in another fashion so as to not be rendered visible, or via any other technique suitable for a given implementation. In still other implementations, embedding may be accomplished using a known digital watermarking technique, that allows a fingerprint or tag to be incorporated invisibly into a frame in a manner that is readily accessible by an appropriate algorithm. In some embodiments, such techniques may allow the fingerprint to be redundantly inserted into the frame, thus allowing the fingerprint to be retrieved even if some of the frame's image data or other associated data is corrupted. Thus, the AR data derived from a given frame can be recalled substantially contemporaneously when the frame is played back.

The fingerprinted video frames 1504 may be combined with the tagged AR data and supplied to a video encoder 1604. The video encoder 1604, in embodiments, takes each of the video frames 1504 and transcodes them into a selected video format, and further encodes the AR data into a data track that is integrated into the final video file produced by video encoder 1604. In other embodiments, the AR data may instead be placed into a separate file or database that is distinct from the video file, but can be recalled and synced during playback by use of the fingerprints. The use of a fingerprint, in addition to allowing synchronization of video frames with AR data, further offers a robustness that allows AR data to remain synchronized even if one or more frames of video are dropped or lost. Where a gap in frames is detected, the unique fingerprints can allow the AR data to readily be resynchronized with the frames. Further, depending upon the nature of the fingerprints, the fingerprint may allow detection of dropped frames, such as where the fingerprint changes incrementally or in a regular pattern between adjacent frames. Duplication of the fingerprint between a frame's image data and AR data may allow detection of dropped frames and/or data where the fingerprint data is missing from either the image data or AR data, but not both. Still further, deviation of the fingerprint from the expected pattern may allow for quick location of the correct AR data to retrieve by indicating how many frames were dropped or otherwise lost.

Although this disclosure has discussed generation of 3D meshes from video captures, it should be understood that still images may also be used in conjunction with video frames with the techniques disclosed herein. A still image may be correlated with one or more video frames and used to generate additional depth points, as discussed above. Further, a single still frame may be used by itself where depth points for the point cloud and AR data are available from other sensors; in such an example, the single still frame may essentially act as a texture map.

Finally, it should be recognized that point clouds from multiple subsequent captures, when correlated with the point cloud of an initial capture, may be merged into the initial capture point cloud, and that these subsequent captures may be from a variety of sources, e.g. crowdsourcing. For example, applying the techniques disclosed herein from crowd-sourced images for popular public locations can result in a dense and highly accurate point cloud for a potentially large and panoramic area. Such a point cloud in conjunction with multiple captured images may enable highly accurate placement of AR objects. Further, the point clouds from the subsequent capture(s) can be used, in conjunction with the initial capture point cloud, to regenerate an expanded and/or enhanced 3D mesh beyond the initial 3D mesh generated from the initial capture point cloud.

In some examples, objects appearing in a source capture may have been removed, moved, or altered, and/or new objects introduced, in the subsequent capture as compared to the original capture. In such scenarios, one or more different 3D meshes may be generated from the combined point clouds by selecting which capture should take priority for determining object presence. For example, a user could select to generate a 3D mesh with the initial capture having priority. In such a selection, objects appearing in the original capture that were removed or moved in subsequent captures would be rendered according to the original capture, but still utilizing data from subsequent captures that expand beyond the original capture and/or augmented objects that are unchanged between captures. In another example, a user could select to generate a 3D mesh with one of the subsequent captures having priority. The result would be a 3D mesh having objects appearing or located in the selected subsequent capture having priority over other earlier (or later) captures.

Figure 7:
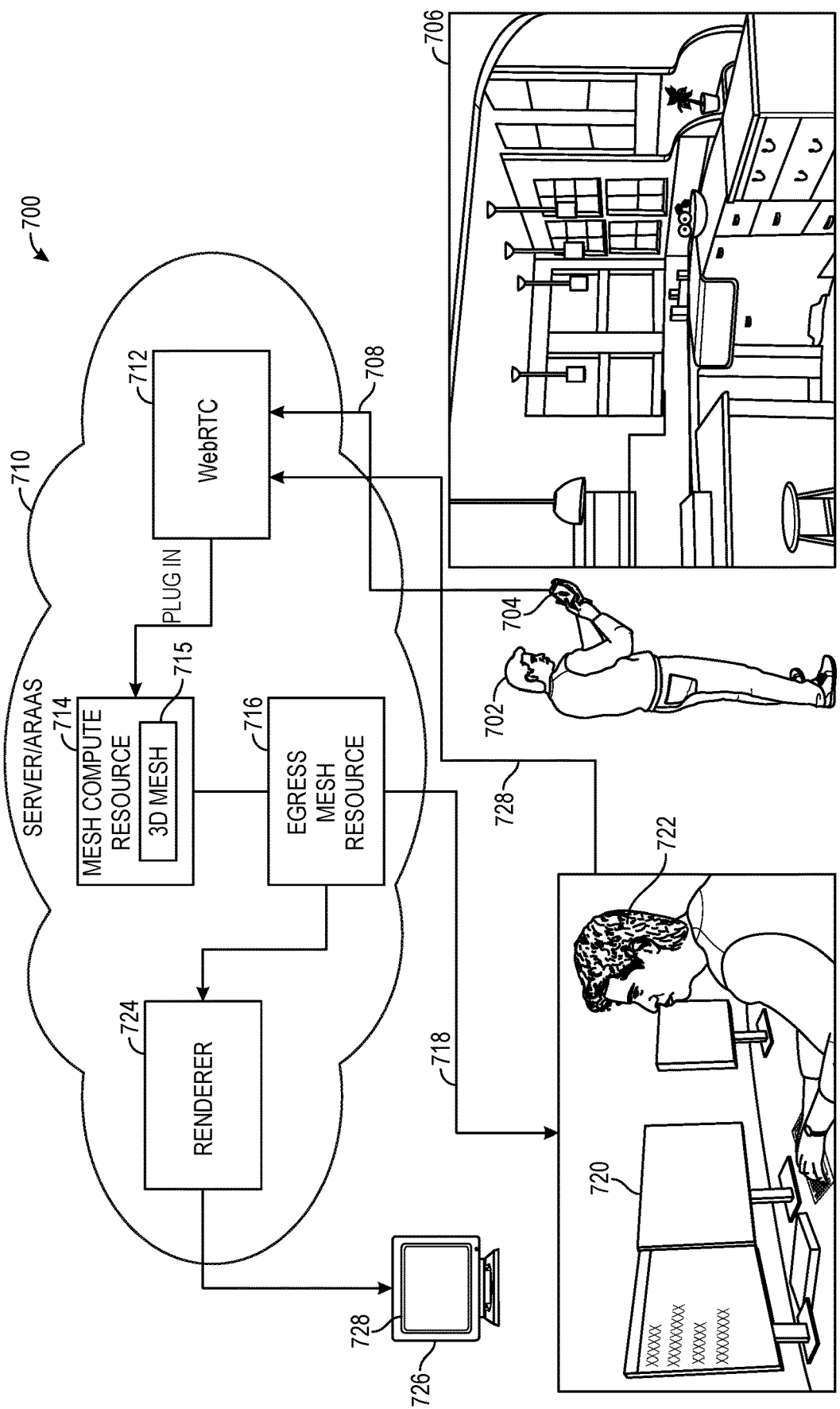
FIG. 7 depicts an example high-level flow for generating a 3D mesh on a server based on data from a user device, and distributing the 3D mesh to another device, according to various embodiments.

FIG. 7 depicts an example high-level flow for generating a 3D mesh on a server, based on data from a user device, and distributing the 3D mesh to another device, according to various embodiments. Diagram 700 shows a user 702 using a consumer device 704 to capture one or more images of a kitchen space 706. In embodiments, the consumer device 704 may include a camera that is part of a smartphone, a tablet, a personal computer, or some other device. In embodiments, consumer device 704 may be similar to consumer device 102, and the camera of consumer device 704 may be similar to camera 104 of FIG. 1. In embodiments, the consumer device 704 is able to capture the one or more images as a video. The one or more images captured by the consumer device 704 may be in an red/green/blue (RGB) format, where one or more pixels of the one or more images are represented by a color. In embodiments, audio related to the one or more images may also be captured. Consumer device 704 is used to capture the surrounding environment, and by extension the surrounding environment of the user 702.

In addition, the consumer device 704 may include multiple cameras, may include lidar, or some other hardware technology, to capture depth information for one or more pixels of the one or more images. In embodiments, this depth information may be based on the location of the consumer device 704 at the time the one or more images are captured. The depth information combined with the one or more images may be referred to as a depth map. In addition, when capturing the depth map, the consumer device 704 may also report an orientation of the camera, for example, in a X-Y-Z or polar coordinate system. In embodiments, if lidar or other hardware technology is not available to directly capture depth information, deep learning techniques may be applied to the one or more images to infer a depth map for the one or more images. In some embodiments, this inference may be based on orientation information of the camera with respect to the one or more images, as well as using camera intrinsics and 6 degrees of freedom (6D) pose information that may include location and orientation.

The image, depth, and camera orientation that is captured by the consumer device 704, or determined by deep learning techniques, may be sent via data path 708 to a cloud service 710 to create and/or update a 3D mesh 715. In embodiments, the 3D mesh 715 may include texturing by associating all or part of a captured image with a surface of the 3D mesh 715. As described herein, the textured 3D mesh may also be referred to as 3D mesh 715. In embodiments, the mesh may be similar to mesh 214 with respect to FIG. 2, where, in embodiments, diagram 700 may include the devices, systems, processes and/or techniques described above with respect to FIG. 2.

In embodiments, the cloud service 710 may include one or more servers (not shown) on which the image, depth, and camera orientation data may be processed into a 3D mesh and/or textured 3D mesh 715, and/or stored for later retrieval. In embodiments, only the one or more images, the depth maps associated with the one or more images, and the camera position may be sent via data path 708 to the cloud service 710 to create and/or update the 3D mesh or textured 3D mesh 715.

Information sent to the cloud service 710 by the consumer device 704 via the data path 708 may include audio, video, depth map, camera orientation, and/or other data as described above relevant to creating a 3D mesh. This information may also include AR data 202, and incorporate elements of time synced video frame fingerprinting 1504 as described with respect to FIG. 5 above. This data may be transferred along data path 708 as insertable streams as well as depth image sequences associated with the one or more images. In embodiments, insertable streams may include insertable streams over WebRTC, an out-of-band stream over Amazon Web Services (AWS)® Kinesis, or fingerprinted video.

In other embodiments, depth and video image sequences captured by the consumer device 704 may be captured as high quality images with no compression and with no motion blur artifacts. In embodiments, if a device is moving quickly the captured video may add blur when extracting frames from the video. This method allows capture of an image and streams only select images which do not contain any blur artifacts. These embodiments may facilitate a reconstructed 3D mesh and/or textured 3D mesh 715 that is free from artifacts, and that may have high fidelity textures of 480 p native resolution or higher. In these embodiments, the individual video frames may be captured at a lower frame rate in order to achieve high fidelity images.

The cloud service 710 may include various components, such as a WebRTC Service 712 that is coupled with a mesh compute resource 714 that is used to create and update the 3D mesh or textured 3D mesh 715. The WebRTC Service 712, or a similar service, may be used to add real-time communication capabilities to applications, and may support video, voice, and generic data transmitted between applications, for example between the consumer device 704 and the cloud service 710. In embodiments, the WebRTC Service 712 may be a real-time connection service used to facilitate audio, video, and other data, which may be referred to as AR data as described elsewhere herein, in along data path 708 to the cloud service 710. In embodiments, the depth map may be synced with the various video frames via insertable streams of WebRTC. In embodiments, the WebRTC Service 712 may then strip the video and depth data and send this data to the mesh compute resource 714.

The mesh compute resource 714 may construct, manage, and/or include the representation of a 3D mesh 715, along with one or more images previously captured in order to create a textured 3D mesh 715. The mesh compute resource 714 may be coupled with an egress mesh resource 716. In embodiments, the mesh compute resource 714 may implement one or more of the processes or techniques described with respect to FIGS. 2-4 above. The egress mesh resource 716 may stream the 3D mesh and/or 3D textured mesh 715 to another computing device, where the computing device will render the a 3D model based upon the streamed 3D mesh or textured 3D mesh, and present the 3D model on display 720. In this way, the physical scene, such as kitchen 706, may be digitally reconstructed for viewing by the service professional 722.

In the example shown, the display 720 may be part of the computing environment of the service professional 722, who may be remotely working in conjunction with customer 702 in redesigning, or making some other change, to the kitchen space 706. It is important to note that, although kitchen space 706 is used in this example, this may apply to any physical space, and may involve multiple customers and/or multiple service professionals or other parties. After reviewing and making changes to the 3D model, the resulting associated 3D mesh or textured 3D mesh 715, along with additional data that includes any changes made, may be transmitted from the service professional 722 along data path 728 to the webRTC 712. In embodiments, the changes made may include inserting AR elements, for example inserting a stove and moving cabinets virtually for the kitchen space 706 to which the customer 702 can review and comment on.

In embodiments, the webRTC 712 may take the changes made by the service professional 722 and transmit them to the mesh compute 714 for the 3D mesh and/or textured 3D mesh 715 to be updated. In embodiments, this may be implemented through the webRTC 712 receiving data from the service professional 722 along data path 728. Note that the service professional 722 may include AR elements within the virtual representation of kitchen space 706 (the physical environment) that are incorporated into the 3D mesh or a textured 3D mesh 715. In this way, the user 702, by viewing on the consumer device 704, may view proposed changes or additions that involve the AR elements, or any other changes represented in the updated 3D mesh and/or textured 3D mesh 715, for evaluation and comments back to the service professional 722.

In embodiments, the updated 3D mesh and/or textured 3D mesh 715 may be transmitted, through the webRTC 712, back to the user device 704, and converted back to a 3D model at the user device 704 for viewing by the user 702. In embodiments, the mesh compute 714 may update the 3D mesh and/or textured 3D mesh 715 periodically, for example, at specific times, specific intervals, or whenever additional data arrives at the cloud service 710. In embodiments, this process may be bi-directional, for example where the user device 704 also receives the mesh and manipulations may be made on the user device 704. In this way, in embodiments, there may be two-way interactive augmented reality sessions using the 3D mesh 715 between the user 702 and the service professional 722.

In this way, a customized pipeline is created for the 3D mesh that can be tuned for parameters, such as resolution, holes, and the like. Similarly, this pipeline may be used to apply textures and to generate 3D geometry used to update the 3D mesh or textured 3D mesh 715.

In embodiments, the cloud service 710 may render the 3D mesh and/or textured 3D mesh 715 using a renderer 724, that may be coupled with the egress mesh resource 716. In embodiments, the renderer 724 produces a 3D model that may be presented directly on a display of another device, for example display 726 or customer device 704. In embodiments, the 3-D model may be presented, displayed, and/or interacted with in a dedicated application running on a device. In embodiments the 3D model may be displayed on display 726 within a browser window 728. In embodiments, the 3D model may be manipulated, for example by rotating, panning, or zooming the 3D model. Various embodiments may have an experience similar to a remote desktop-type solution. In this way, implementing the 3D mesh and/or textured 3D mesh 715 using the cloud service 710 has flexibility for extended cross-platform support.

Figure 8:
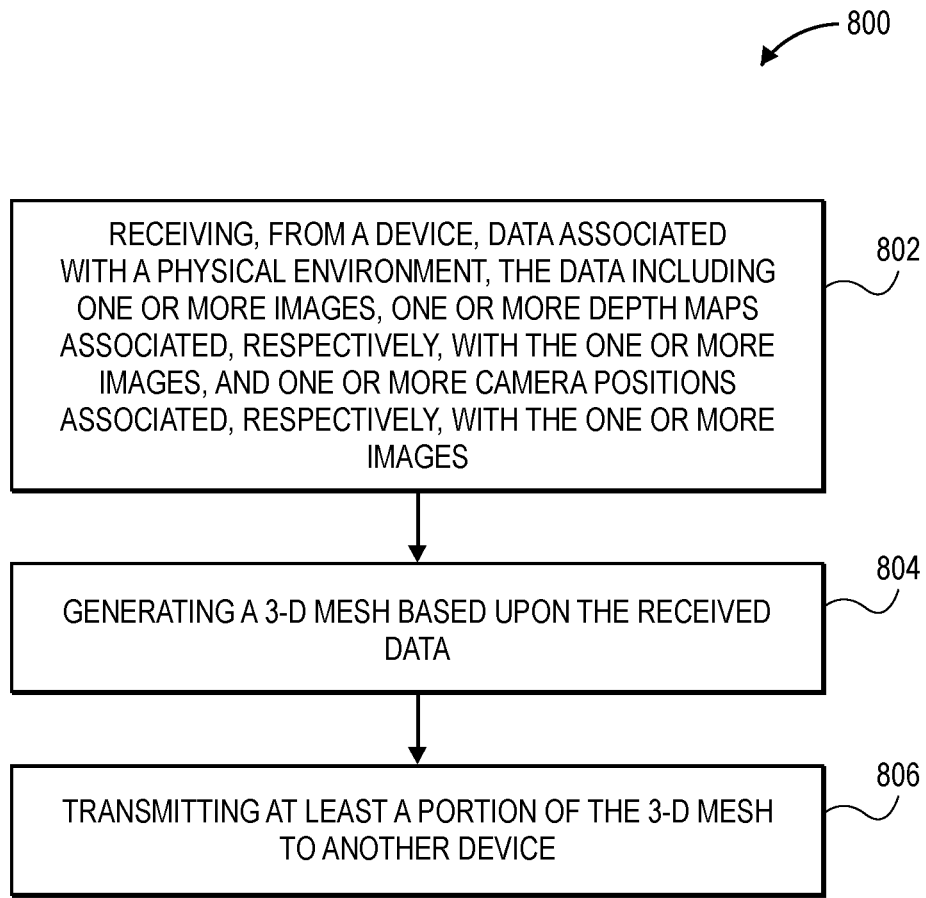
FIG. 8 is a flowchart of the operations of an example method for generating a 3D mesh on a server, according to various embodiments.

FIG. 8 is a flowchart of the operations of an example method for generating a 3D mesh on a server, according to various embodiments. In embodiments, all or part of process 800 may be used to generate a 3D mesh and/or 3D textured mesh, such as 3D mesh and/or 3D textured mesh 715 of FIG. 7. Process 800 may be implemented in part, or in total by the apparatus, methods, techniques, and/or systems as described herein with respect to FIGS. 1-7.

At block 802, the process may include receiving, by the server from a device, data associated with a physical environment, the data including one or more images, one or more depth maps associated, respectively, with the one or more images, and one or more camera positions associated, respectively, with the one or more images. In embodiments, the data associated with a physical environment may be similar to the data captured by the consumer device 704 of the physical space 706, that is then transmitted via data path 708 to the cloud service 710 of FIG. 7.

At block 804, the process may further include generating, by the server, a 3D mesh based upon the received data. In embodiments, the 3D mesh may be similar to 3D mesh 715 of FIG. 7. In embodiments, the 3D mesh 715 may be created and/or maintained by the mesh compute system 714. Embodiments of the process described with respect to or related to block 804 may also be performed by one or more techniques as described related to the 3D mesh with respect to FIGS. 2-3 above.

At block 805, the process may further include transmitting, by the server, at least a portion of the 3D mesh to another device. In embodiments, the egress mesh resource 716 may receive all or part of the 3D mesh 715, and may transmitted using data path 718 to a service professional 722. As described above, when the 3D mesh is received by the service professional 722, the service professional may use a local computer to create a 3D model based upon the 3D mesh, where the 3D mesh may include textures associated with various facets of the 3D mesh that are based upon one or more images received from the consumer device 704.

In other embodiments, the egress mesh resource 716 may send all or part of the 3D mesh 715 to a renderer 724, where the 3D mesh 715 is rendered into a 3D model. The 3D model may then be transmitted to a computing device such as computing device 726 where the 3D model may be displayed in a browser window 728. In other embodiments, either the 3D model or the 3D mesh may be transmitted to the consumer device 704, for display to the consumer 702.

Figure 9:
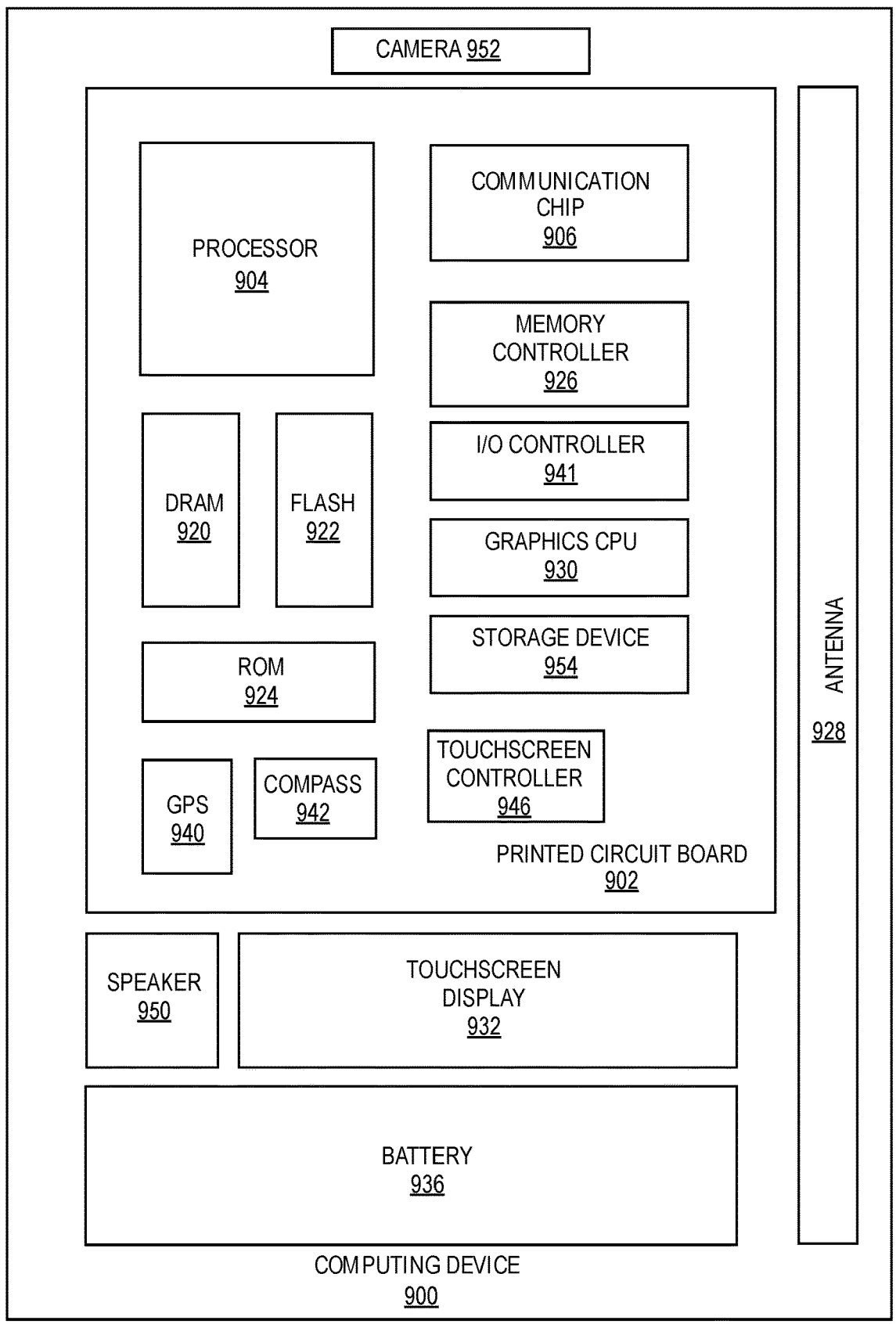
FIG. 9 is a block diagram of an example computer that can be used to implement some or all of the components of the system of FIG. 1 or 7, according to various embodiments.

FIG. 9 illustrates an example computer device 900 that may be employed by the apparatuses and/or methods described herein, in accordance with various embodiments. As shown, computer device 900 may include a number of components, such as one or more processor(s) 904 (one shown) and at least one communication chip 906. In various embodiments, the one or more processor(s) 904 each may include one or more processor cores. In various embodiments, the one or more processor(s) 904 may include hardware accelerators to complement the one or more processor cores. In various embodiments, the at least one communication chip 906 may be physically and electrically coupled to the one or more processor(s) 904. In further implementations, the communication chip 906 may be part of the one or more processor(s) 904. In various embodiments, computer device 900 may include printed circuit board (PCB) 902. For these embodiments, the one or more processor(s) 904 and communication chip 906 may be disposed thereon. In alternate embodiments, the various components may be coupled without the employment of PCB 902.

Depending on its applications, computer device 900 may include other components that may be physically and electrically coupled to the PCB 902. These other components may include, but are not limited to, memory controller 926, volatile memory (e.g., dynamic random access memory (DRAM) 920), non-volatile memory such as read only memory (ROM) 924, flash memory 922, storage device 954 (e.g., a hard-disk drive (HDD)), an I/O controller 941, a digital signal processor (not shown), a crypto processor (not shown), a graphics processor 930, one or more antennae 928, a display, a touch screen display 932, a touch screen controller 946, a battery 936, an audio codec (not shown), a video codec (not shown), a global positioning system (GPS) device 940, a compass 942, an accelerometer (not shown), a gyroscope (not shown), a speaker 950, a camera 952, and a mass storage device (such as hard disk drive, a solid state drive, compact disk (CD), digital versatile disk (DVD)) (not shown), and so forth.

In some embodiments, the one or more processor(s) 904, flash memory 922, and/or storage device 954 may include associated firmware (not shown) storing programming instructions configured to enable computer device 900, in response to execution of the programming instructions by one or more processor(s) 904, to practice all or selected aspects of the system 100, process flow 200, method 300, process flow 400, process flow 700, method 800, process flow 1500, and/or process flow 1600, described herein. In various embodiments, these aspects may additionally or alternatively be implemented using hardware separate from the one or more processor(s) 904, flash memory 922, or storage device 954.

The communication chips 906 may enable wired and/or wireless communications for the transfer of data to and from the computer device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 906 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 900 may include a plurality of communication chips 906. For instance, a first communication chip 906 may be dedicated to shorter range wireless communications such as Wi-Fi and Bluetooth, and a second communication chip 906 may be dedicated to longer range wireless communications such as GPS, EDGE, GPRS, CDMA, WiMAX, LTE, Ev-DO, and others.

In various implementations, the computer device 900 may be a laptop, a netbook, a notebook, an ultra book, a smartphone, a computer tablet, a personal digital assistant (PDA), a desktop computer, smart glasses, or a server. In further implementations, the computer device 900 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 10 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1002 may include a number of programming instructions 1004. Programming instructions 1004 may be configured to enable a device, e.g., computer 900, in response to execution of the programming instructions, to implement (aspects of) system 100, process flow 200, method 300, process flow 400, process flow 700, method 800, process flow 1500, and/or process flow 1600. I n alternate embodiments, programming instructions 1004 may be disposed on multiple computer-readable non-transitory storage media 1002 instead. In still other embodiments, programming instructions 1004 may be disposed on computer-readable transitory storage media 1002, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

EXAMPLES

Example 1 is a method for implementing a 3D mesh on a server, the method comprising: receiving, by the server from a device, data associated with a physical environment, the data including one or more images, one or more depth maps associated, respectively, with the one or more images, and one or more camera positions associated, respectively, with the one or more images; generating, by the server, a 3D mesh based upon the received data; and transmitting, by the server, at least a portion of the 3D mesh to another device.

Example 2 may include the method of example 1, further comprising generating one or more textures to apply to the 3D mesh, the one or more textures based upon at least one of the one or more images; and wherein transmitting, by the server, at least a portion of the 3D mesh to another device further includes transmitting, by the server, at least a portion of the 3D mesh and at least a portion of the one or more textures to the other device.

Example 3 may include the method of example 2, wherein transmitting at least a portion of the 3D mesh and the one or more textures further includes: rendering, by the server, a 3D model of the physical environment based at least upon the 3D mesh and the one or more textures; and streaming, by the server, the rendered 3D model to the other device for display.

Example 4 may include the method of example 3, further comprising storing, by the server, the 3D model.

Example 5 may include the method of example 3, wherein streaming the rendered 3D model further includes streaming the rendered 3D model in an HTTP format for display in a browser window displayed on the other device.

Example 6 may include the method of example 2, wherein transmitting at least a portion of the 3D mesh and the one or more textures further includes transmitting data describing the 3D mesh and the one or more textures to the other device for the other device to render and to display a 3D model of the physical environment based on the transmitted data.

Example 7 may include the method of example 1, wherein receiving the data associated with the physical environment further includes receiving the data associated with the physical environment via an insertable stream.

Example 8 may include the method of example 1, wherein receiving the data associated with the physical environment further includes receiving the data associated with the physical environment via a WebRTC service.

Example 9 may include the method of example 1, further comprising: receiving, by the server from the other device, revised 3D mesh data; and updating, by the server, the 3D mesh data based upon the revised 3D mesh data.

Example 10 may include the method of example 1, wherein the one or more images are video frames.

Example 11 may include the method of example 10, wherein the one or more images are not compressed.

Example 12 may include the method of any one of examples 1-11, further comprising storing, by the server, the 3D mesh.

Example 13 may be a method for implementing a device, the method comprising: receiving, by the device from a server, 3D mesh data, the 3D mesh data including one or more textures based upon one or more images of a physical environment; and rendering, by the device, a 3D model of the physical environment based upon the received 3D mesh data.

Example 14 may include the method of example 13, further including: generating, by the device, revised 3D mesh data that indicates proposed alterations to the physical environment; and transmitting, by the device to the server, the revised 3D mesh data.

Example 15 may include the method of example 14, wherein the revised 3D mesh data includes texturing to indicate the proposed alterations.

Example 16 may include the method of any one of examples 13-15, wherein the device is a smartphone or a tablet.

Example 17 may be an apparatus comprising: one or more computer processors; memory coupled with the one or more processors, the memory including instructions that, when executed, cause the one or more computer processors to: receive, from a device, data associated with a physical environment, the data including one or more images, one or more depth maps associated, respectively, with the one or more images, and one or more camera positions associated, respectively, with the one or more images; generate a 3D mesh based upon the received data; and transmit at least a portion of the 3D mesh to another device.

Example 18 may include the apparatus of example 17, wherein the instructions are further to cause the one or more processors to generate one or more textures to apply to the 3D mesh, the one or more textures based upon at least one of the one or more images; and wherein to transmit at least a portion of the 3D mesh to another device further includes to transmit at least a portion of the 3D mesh and at least a portion of the one or more textures to the other device.

Example 19 may include the apparatus of example 18, wherein to transmit at least a portion of the 3D mesh and the one or more textures further includes: to render a 3D model of the physical environment based at least upon the 3D mesh and the one or more textures; and to stream the rendered 3D model to the other device for display.

Example 20 may include the apparatus of example 19, wherein to stream the rendered 3D model further includes two stream the rendered 3D model in an HTTP format for display in a browser window displayed on the other device.

Example 21 may include the apparatus of example 18, wherein to transmit at least a portion of the 3D mesh and the one or more textures further includes to transmit data describing the 3D mesh and the one or more textures to the other device for the other device to render and to display a 3D model of the physical environment based on the transmitted data.

Example 22 may include the apparatus of example 17, wherein to receive the data associated with the physical environment further includes to receive the data associated with the physical environment via an insertable stream.

Example 23 may include the apparatus of example 17, wherein receiving the data associated with the physical environment further includes receiving the data associated with the physical environment via a WebRTC service.

Example 24 may include the apparatus of example 17, wherein the instructions are further to cause the one or more processors to: receive, from the other device, revised 3D mesh data; and update, the 3D mesh data based upon the revised 3D mesh data.

Example 25 may include the apparatus of example 17, wherein the one or more images are video frames.

Example 26 may include the apparatus of any one of examples 19-25, wherein the one or more images are not compressed.

Example 27 is an apparatus comprising: one or more computer processors; memory coupled with the one or more processors, the memory including instructions that, when executed, cause the one or more computer processors to: receive, from a server, 3D mesh data, the 3D mesh data including one or more textures based upon one or more images of a physical environment; and render a 3D model of the physical environment based upon the received 3D mesh data.

Example 28 may include the apparatus of example 27, wherein the instructions are further to cause the one or more computer processors to: generate revised 3D mesh data that indicates proposed alterations to the physical environment; and transmit, to the server, the revised 3D mesh data.

Example 29 may include the apparatus of example 27, wherein the revised 3D mesh data includes texturing to indicate the proposed alterations.

Example 30 may include the apparatus of any one of examples 27-29, wherein the apparatus is a smartphone or a tablet.

What is claimed is:

1. A method for implementing a 3D mesh on a server for a two-way interactive augmented reality session, the method comprising:
   receiving, by the server from a device, data associated with a physical environment of a first user of the device, the data including images from a video captured by a camera associated with the device, one or more depth maps associated, respectively, with the images, and one or more camera positions associated, respectively, with the images;
   generating, by the server, a 3D mesh based upon the received data in real-time;
   performing texture mapping, by the server, where the images from the video are used as texture maps and mapped onto the 3D mesh to generate a textured 3D mesh representing the physical environment of the first user;
   streaming, by the server to an other device of a second user, the textured 3D mesh, wherein the other device renders a 3D model based on the textured 3D mesh and presents the 3D model on a display device for viewing by the second user;
   receiving, by the server from the other device in real-time, additional data that includes changes made by the second user to the 3D model, the changes including any augmented reality (AR) elements inserted into the 3D model;
   updating, by the server, the textured 3D mesh with the additional data in real-time; and
   transmitting, by the server, the updated textured 3D mesh back to the device of the first user for viewing in real-time to implement an interactive AR session using the 3D mesh between the first user and the second user; and
   iteratively repeating the receiving, generating, updating, and transmitting steps to enable real-time bi-directional manipulation and viewing of the 3D mesh by both the first user and the second user.

2. The method of claim 1, wherein receiving the data associated with the physical environment further includes receiving the data associated with the physical environment via an insertable stream.

3. The method of claim 1, wherein receiving the data associated with the physical environment further includes receiving the data associated with the physical environment via a WebRTC service.

4. The method of claim 1, wherein the one or more images are video frames.

5. The method of claim 4, wherein the one or more images are not compressed.

6. A server for providing a for a two-way interactive augmented reality session comprising:
   one or more computer processors;
   memory coupled with the one or more processors, the memory including instructions that, when executed, cause the one or more computer processors to:
   receive, from a device, data associated with a physical environment of a first user of the device, the data including images from a video captured by a camera associated with the device, one or more depth maps associated, respectively, with the images, and one or more camera positions associated, respectively, with the images;
   generate a 3D mesh based upon the received data in real-time;
   perform texture mapping, by the server, where the images from the video are used as texture maps and mapped onto the 3D mesh to generate a textured 3D mesh representing the physical environment of the first user;
   stream an abstract video based upon the 3D mesh, and at least a portion of the 3D mesh to an other device of a second user, wherein the abstract video includes frames from the images and frames generated by rendering objects from the 3D mesh, wherein the other device renders a 3D model based on the abstract video or the 3D mesh and presents the 3D model on a display device for viewing by the second user;
   receive from the other device in real-time, additional data that includes changes made by the second user to the 3D model, the changes including any augmented reality (AR) elements inserted into the 3D model;
   update the 3D mesh with the additional data in real-time; and
   transmit the updated 3D mesh back to the device of the first user for viewing in real-time to implement an interactive AR session using the 3D mesh between the first user and the second user; and
   iteratively repeat the receive, generate, update, and transmit steps to enable real-time bi-directional manipulation and viewing of the 3D mesh by both the first user and the second user.

7. The server of claim 6,
   wherein to stream the abstract video and at least a portion of the 3D mesh to the other device further includes to transmit at least a portion of the 3D mesh and at least a portion of the texture maps to the other device.

* * * * *